United States Patent [19]

Honda

[11] Patent Number: 4,894,578
[45] Date of Patent: Jan. 16, 1990

[54] ULTRASONIC DRIVING DEVICE

[75] Inventor: Keisuke Honda, Aichi, Japan

[73] Assignee: Honda Electronic Co., Ltd., Aichi, Japan

[21] Appl. No.: 221,719

[22] Filed: Jul. 20, 1988

[30] Foreign Application Priority Data

Jul. 26, 1987 [JP] Japan ................................. 62-187341

[51] Int. Cl.⁴ ........................................... H01L 41/08
[52] U.S. Cl. .................................. 310/323; 310/366; 310/369
[58] Field of Search ............... 310/365, 366, 333, 369, 310/323, 328

[56] References Cited

FOREIGN PATENT DOCUMENTS 0845198 7/1981 U.S.S.R. ............................... 310/328

Primary Examiner—Mark O. Budd
Attorney, Agent, or Firm—Burgess, Ryan and Wayne

[57] ABSTRACT

In the present invention, an electrode in both end portions of a piezoelectric vibrator is respectively divided in two, alternative current voltage is supplied to each of electrodes of the both end portions, whereby reversible circumferential progressive wave arises on the both end portions or side portion of a state consisting of the piezoelectric vibrator. A member to be driven is composed on each of the both end portions or the side portion of the stator.

6 Claims, 4 Drawing Sheets

PRIOR ART

ULTRASONIC DRIVING DEVICE

BACKGROUND OF THE INVENTION

The present invention relates to an ultrasonic driving device comprising a stator consisting of a columnar type piezoelectric vibrator having divided electrodes in one end at least.

In a known ultrasonic motor using a piezoelectric vibrator, two groups of electrodes are attached to one end of a ring type piezoelectric ceramic vibrator, the two group of electrodes are so positioned that standing waves respectively generated by the two groups of electrodes are shifted every $\pi/2$ in each position. The parts of the ring type piezoelectric vibrator corresponding to the electrode are alternately polarized in reverse. Also, the two groups of the electrodes are respectively connected to two oscillators for respectively generating alternating current voltages having a $\pi/2$ phase shift from each other. When the alternating current voltages from the two oscillators are respectively applied to the two groups of electrodes, the two standing waves having a $\pi/2$ phase shift from each other generated on the surfaces of the ring type piezoelectric vibrator and then progressive waves owing to a compound of the two standing waves generated on the surfaces of the ring type piezoelectric vibrator. Therefore, when a rotary member is put on the ring type piezoelectric vibrator and the rotary member is strongly pressed to the ring type piezoelectric vibrator, the rotary member is rotated by the progressive waves.

In the prior ultrasonic motor, since the ring type piezoelectric vibrator must be polarized in many portions thereof and the two oscillators must be connected to the electrodes, the construction of the ring type piezoelectric vibrator is complex and the cost of the ultrasonic motor becomes expensive.

SUMMARY OF THE INVENTION

It is, therefore, the primary object of the present invention to provide an ultrasonic driving device having a simple construction.

It is another object of the present invention to provide an ultrasonic driving device having a stator consisting of a columnar piezoelectric vibrator providing with dividing electrodes at both ends.

It is another object of the present invention to provide an ultrasonic driving device having a stator consisting of a columnar piezoelectric vibrator in which gaps between divided electrodes in both ends are shifted from each other.

In order to accomplish the above and other object, the present invention provides a stator consisting of a piezoelectric vibrator having divided electrodes in both ends, and a member to driven composed on one end or a side portion of the stator, alternating current voltage being applied to two or more electrodes.

DESCRIPTION OF THE PREFERRED EMBODIMENTS

Figure 1:
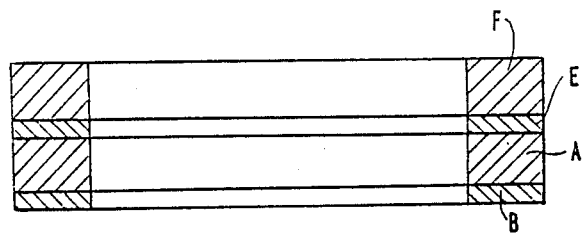
FIG. 1 shows a sectional view of an ultrasonic motor in the prior art.
Figure 2:
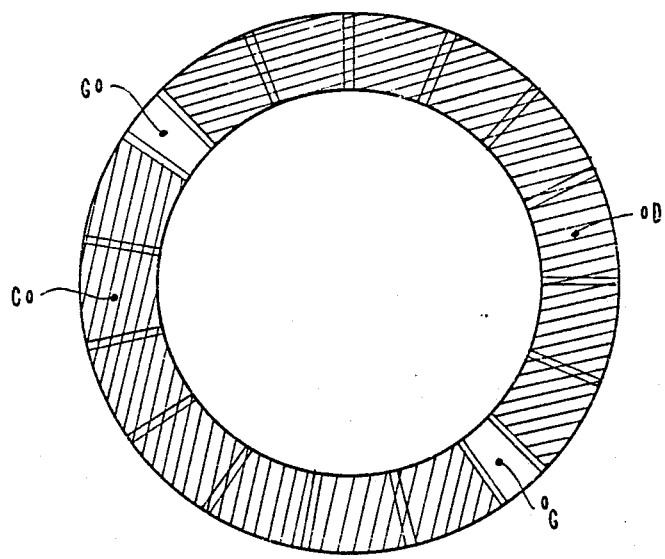
FIG. 2 shows a plane view of a form of a piezoelectric vibrator and a composition of electrodes of the piezoelectric vibrator in the ultrasonic motor in FIG. 1.

Referring to the prior art in FIG. 1, a ring type piezoelectric vibrator B is attached to a ring type resilient member A and the piezoelectric vibrator B vibrates with the resilient member. The piezoelectric vibrator B is divided in 17 parts by the ratio of e.g. 22.5° or 11.25°. The respective neighbouring portions in the 17 parts of the piezoelectric vibrator B are polarized by the reverse polarity from each other as shown in FIG. 2. The two portions C and D in the one side of the piezoelectric vibrator B are respectively attached as an electrode by conductive paint as shown in FIG. 2. The portion G in FIG. 2 shows an earth electrode. The member F to be driven to which slider E is attached is mounted on the resilient member A.

In the ultrasonic motor in the prior art, the alternating current voltage of $V_0 \sin \omega t$ is applied to the one electrode C and the alternating current voltage $V_0 \cos \omega t$ is applied to the other electrode D, where $V_0$ is instantaneous value, $\omega$ is radian frequency and t is time. The phases of these voltages shift by $\pi/2$ from each other. Thereby, the divided portions of the piezoelectric vibrator B alternately produce expansion and contraction and thus, the resilient member A produces bending vibration. Therefore, a standing wave is generated in the resilient member A and a progressive wave is generated on the resilient member A. Thus, the driven member F having the slider E is rotated on the resilient member A.

However, in the prior ultrasonic motor, because the divided portions of the ring type piezoelectric vibrator B must be alternately polarized and the divided electrodes must be formed on the divided portion of the piezoelectric vibrator B, the composition of the prior ultrasonic motor is complex.

Figure 3:
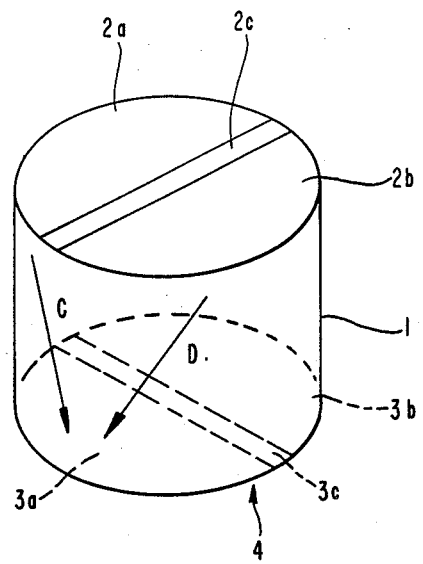
FIG. 3 shows a perspective view of a stator of an ultrasonic driving device of an embodiment in the present invention.

Referring to FIG. 3, in a stator consisting of a columnar piezoelectric vibrator in the embodiment of the present invention, divided electrodes 2a and 2b are provided with one end of a piezoelectric vibrator 1 and divided electrodes 3a and 3b are provided with the other end of the piezoelectric vibrator 1. Gaps 2c and 3c are respectively formed between the divided electrodes 2a, 2b and 3a, 3b and are shifted from each other (about 90° in this embodiment).

Figure 4:
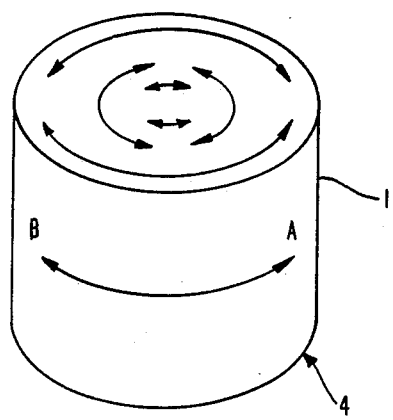
FIG. 4 shows a view for explaining an operation of a stator in FIG. 3.

In the above stator 4, when an alternating current voltage is applied to the divided electrode 2a and electrode 3a, a circumferential progressive wave progressing a one direction arises on the end portions and side portion of the stator 4 as shown by an arrow A in FIG. 4. When an alternating current voltage is applied to in the divided electrode 2b and electrode 3a, a circumferential progressive wave progressing to the reverse direction arises on the end portions and side portion of the stator 4 as shown by an arrow B in FIG. 4.

Explaining the principle for generating the circumferential progessive wave on the stator 4, when the alternating current voltage having the resonance frequency of the piezoelectric vibrator 1 is applied to the electrodes 2a and 3a, since the gaps 2c and 3c are shifted by about 90°, the voltage is obliquely exerted in the stator 4 as shown by an arrow C in FIG. 3. Therefore, a thickness vibration is changed to torsion vibration in the stator 4 and a circumferential progressive wave in the direction of the arrow A may arise on the end and side portions of the stator 4 as shown in FIG. 4. When the voltage is applied to the electrodes 2b and 3b, also the circumferential progressive wave arises in the direction of the arrow A in the same as the above composition.

When the alternating current voltage having the resonance frequency of the piezoelectric vibrator is applied to the electrodes 2b and 3a, the voltage is obliquely exerted in the stator 4 as shown by an arrow D in FIG. 3. Therefore, a thickness vibration is changed to a torsion vibration in the stator 4 and circumferential progressive wave in the direction of the arrow B may arise on the end and side portions of the stator 4 as shown in FIG. 4. When the voltage is applied to the electrodes 2a and 3b, also the circumferential progressive wave arises in the direction of the arrow B.

In the above instance, even if the gaps 2c and 3c are shifted by 90°, the shift of these gaps 2c and 3c may be 45° or the gaps 2c and 3c may be slightly shifted. The shift of the gaps 2c and 3c is not strictly set and the voltage may be obliquely exerted on the stator by the electrodes.

In the above instance, if the gaps 2c and 3c are set in parallel and the voltage is applied to the electrodes 2a and 3a or 2a and 3b, the direction of the circumferential progressive wave on the stator becomes unstable, and the circumferential progressive wave generates to the arrow A or B by the slight change of the frequency of the resonance of the stator 4.

Figure 5:
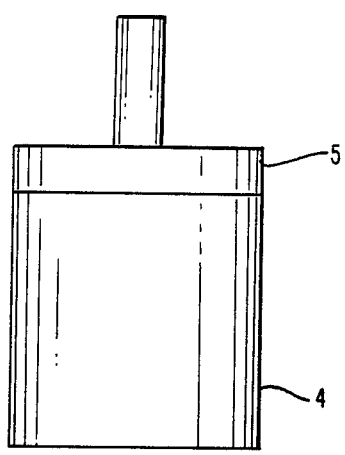
FIG. 5 shows a simple side view of an ultrasonic driving device of the embodiment in the present invention.

Referring to FIG. 5, when a member 5 to be driven is pressed on the end portion of a stator 4 consisting of a columnar type piezoelectric vibrator, the member 5 is rotated very smoothly. Also, if the side portion of the member is pressed on the side portion of stator 4, the member 5 is rotated very smoothly.

Figure 6:
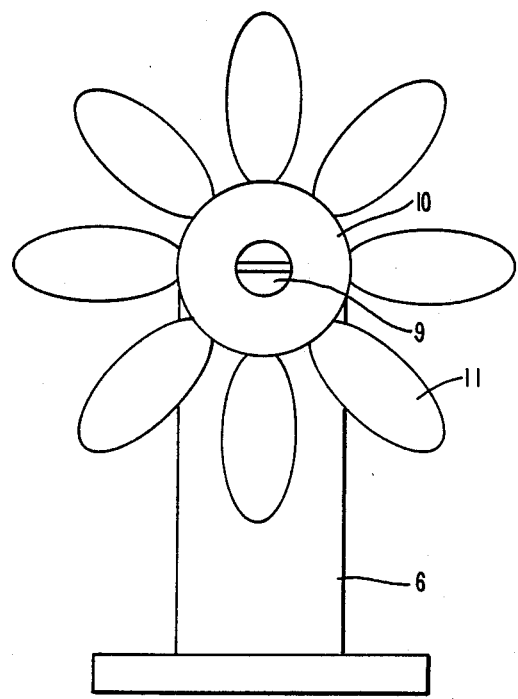
FIG. 6 shows a front view of a fun of an ultrasonic driving device according to the present invention.
Figure 7:
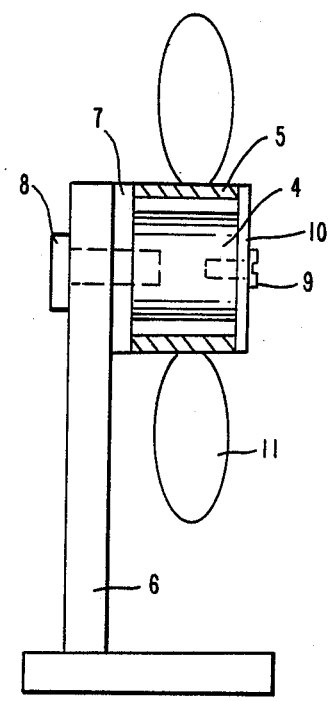
FIG. 7 shows a side view of the fun of FIG. 6.
Figure 8:
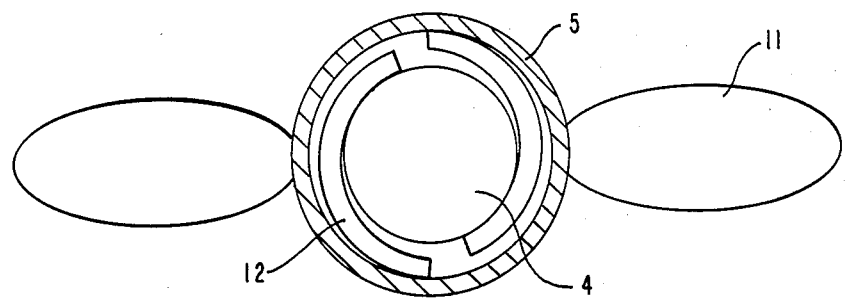
FIG. 8 shows a sectional view of one part of the fun in FIG. 6.

Referring to FIG. 6, FIG. 7 and FIG. 8, a stator 4 and a supporting plate 7 are fixed with a base 6 by a screw 8. A cylindric member 5 to be driven is mounted on a circumferential portion of the stator 4 and a stopper 10 is fixed on the end portion of the stator 4 by a screw 9. The ends of a plurality of vanes 11 are fixed on the member 5. As shown in FIG. 8, one end of each of the springs 12 is fixed on the inside of the member 5 and the other end of each spring 12 is pressed on the stator 4. As shown in FIG. 3, when the alternating current voltage having resonance frequency of the piezoelectric vibrator is applied to two of the electrodes 2a or 2b and 3a or 3b, the member 5 is rotated and this device can be used as a fan.

Figure 9:
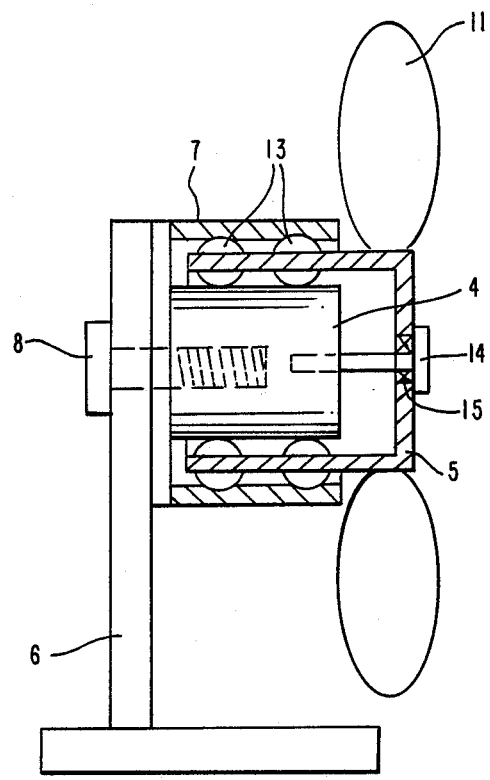
FIG. 9 shows a side structural view of a fun of the other ultrasonic driving device using according to the present invention.

Referring to FIG. 9, on one end of the stator 4 a cylindric supporting member 7 is fixed with a base 6 by a screw 8. A space is provided between the stator 4 and the cylindric supporting member 7 and a plurality of balls 13 supported by a member 5 to be driven are put between the stator 4 and the cylindric supporting member 7 and are inserted in grooves of the member 7. A bearing 15 of the member 5 is rotatably supported by a screw 14 fixed with the other end of the stator 4 and a plurality of vanes are fixed with the outside of the member 5.

In the fan having the above composition, the balls 13 of the member 5 are rotated by the circumferential progressive wave generated on the stator 4 and roll in the grooves of the cylindric supporting member 7. In this fan, if lubricating oil is supplied to the balls 13, the supporting member 7 and balls 13 are protected from wear. Also, since the balls 13 are contacted with the hard side portion of the piezoelectric vibrator 1 made of ceramics, the piezoelectric vibrator and its electrodes need not have protective members.

In the above embodiment, though the electrodes of the end portions of the piezoelectric vibrator 1 are respectively divided in two, the electrodes may be divided in three or more and then if the alternating voltage is supplied to one or more of the electrodes at one end of the piezoelectric vibrator, the circumferential progressive wave can be produced on the stator 4.

What is claimed is:

1. An ultrasonic driving device comprising:
    a stator including a columnar piezoelectric vibrator and at least two divided electrodes at end portions of the piezoelectric vibrator,
    a member to be driven on one end portion or side portion of the stator, and
    means for supplying an alternating current voltage having a resonant frequency for producing vibration in a thickness direction of the piezoelectric vibrator, to at least two of said electrodes.

2. An ultrasonic driving device as set forth in claim 1 wherein the electrodes include gaps which are slightly shifted from each other.

3. An ultrasonic driving device as set forth in claim 1 wherein the electrodes include gaps which are shifted by 45° from each other.

4. An ultrasonic driving device as set forth in claim 1 wherein the electrodes include gaps which are shifted by 90° from each other.

5. An ultrasonic driving device comprising:
    a base,
    a stator including a cylindrical piezoelectric vibrator and at least two divided electrodes at end portions thereof, the stator being fixed with the base,
    a plate fixed with the base,
    a member to be driven rotatably supported at a side portion of the stator,
    a plurality of vanes fixed on the member,
    a plurality of springs, each having one end contacted with the side portion of the stator, and
    means for supplying an alternating current voltage having a resonant frequency for producing vibration in a thickness direction of the piezoelectric vibrator.

6. An ultrasonic driving device comprising:
    a base,
    a stator including a cylindrical piezoelectric vibrator and at least two divided electrodes at end portions thereof, the stator being fixed with the base,
    a cylindrical supporting member fixed with the base,
    a member to be driven rotatably supported at a side portion of the stator,
    a plurality of balls rotatably supported in the member to be driven and positioned between the cylindrical supporting member and the stator,
    a plurality of vanes fixed on the member, and
    means for supplying an alternating current voltage having a resonant frequency for producing vibration in a thickness direction of the piezoelectric vibrator.

* * * * *